July 8, 1924.
B. H. HOWARD ET AL
1,500,733
FEEDER FOR INGOT MOLDS
Filed Dec. 29, 1923   3 Sheets-Sheet 1
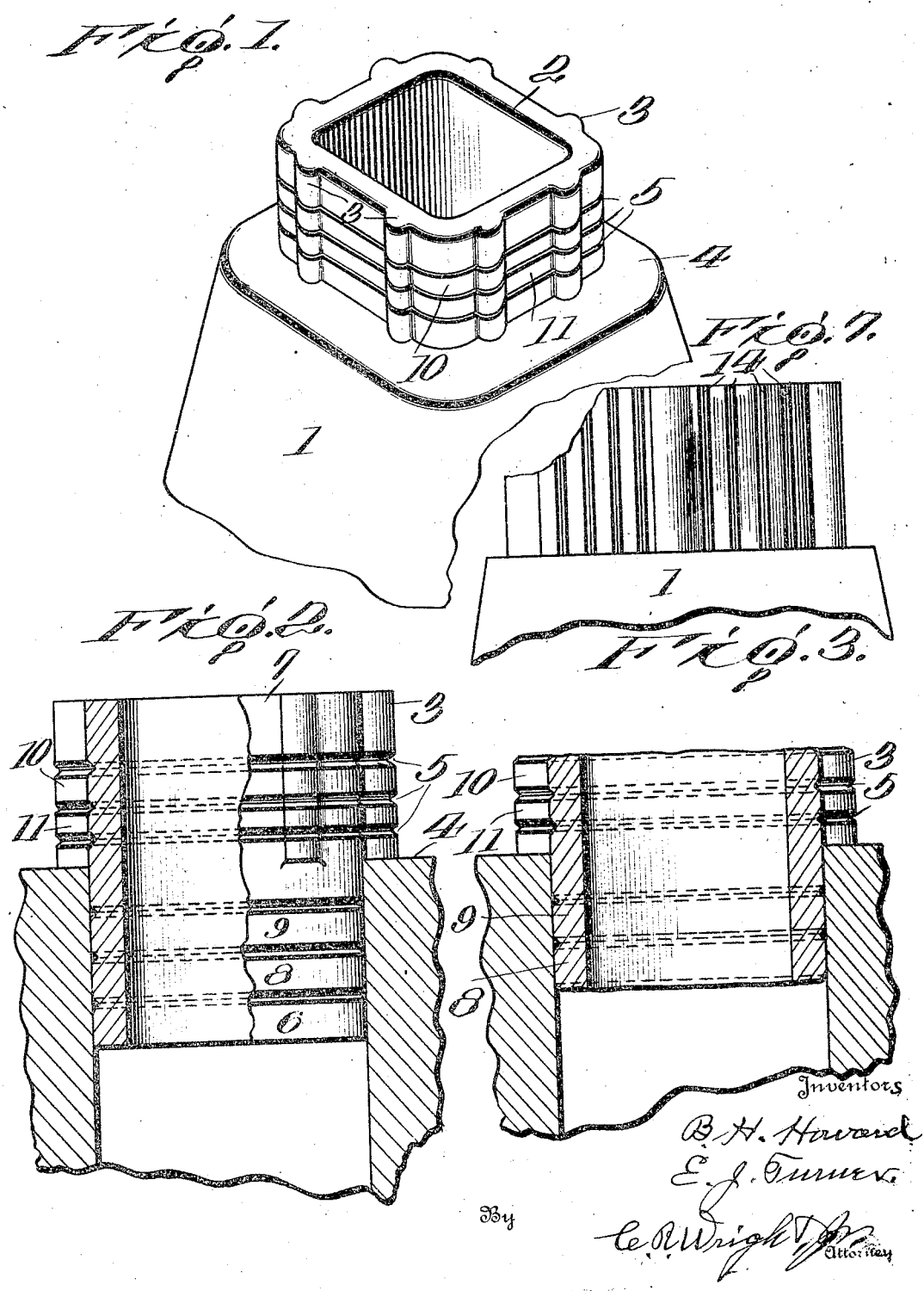

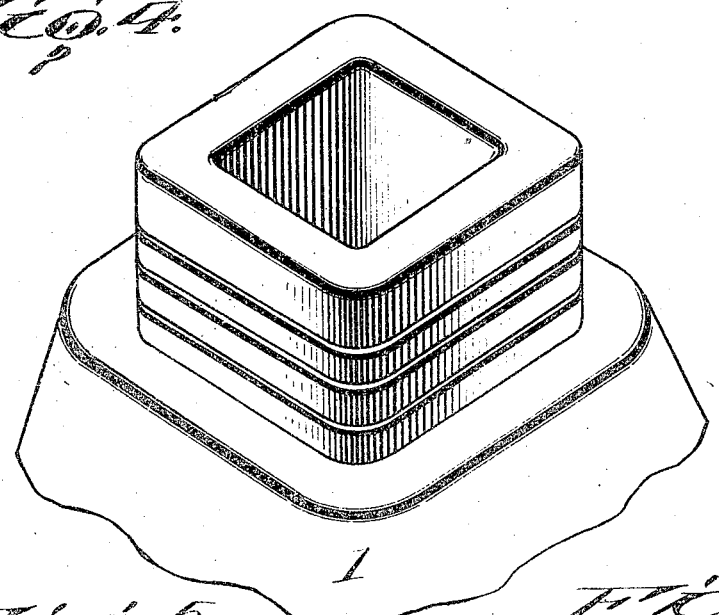
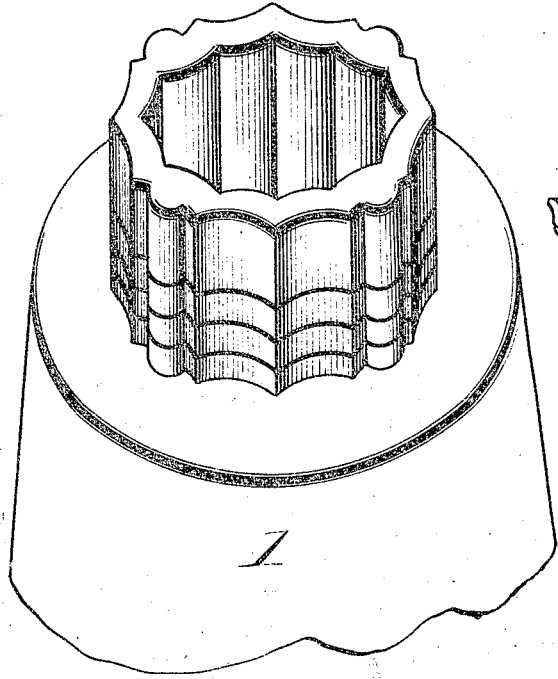
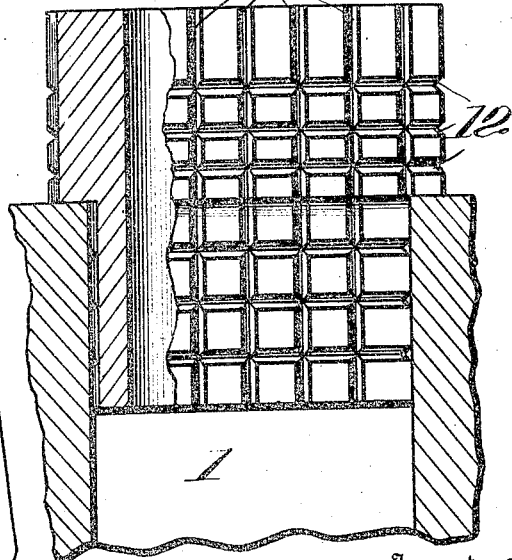

July 8, 1924.
B. H. HOWARD ET AL
FEEDER FOR INGOT MOLDS
Filed Dec. 29, 1923 3 Sheets-Sheet 3
1,500,733
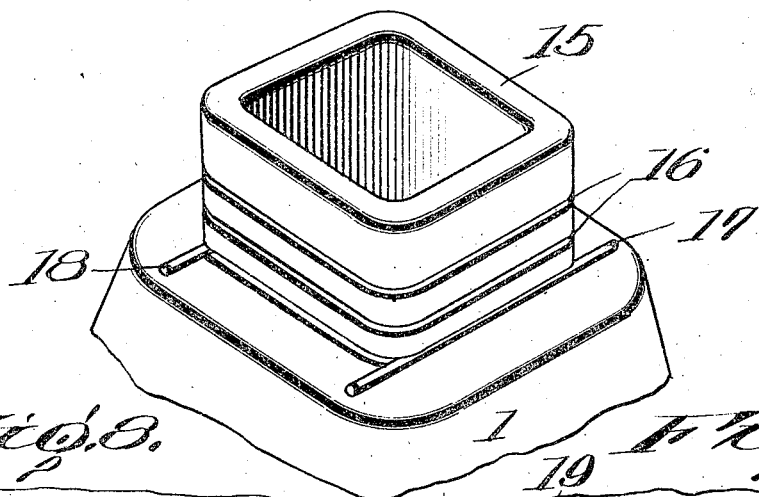
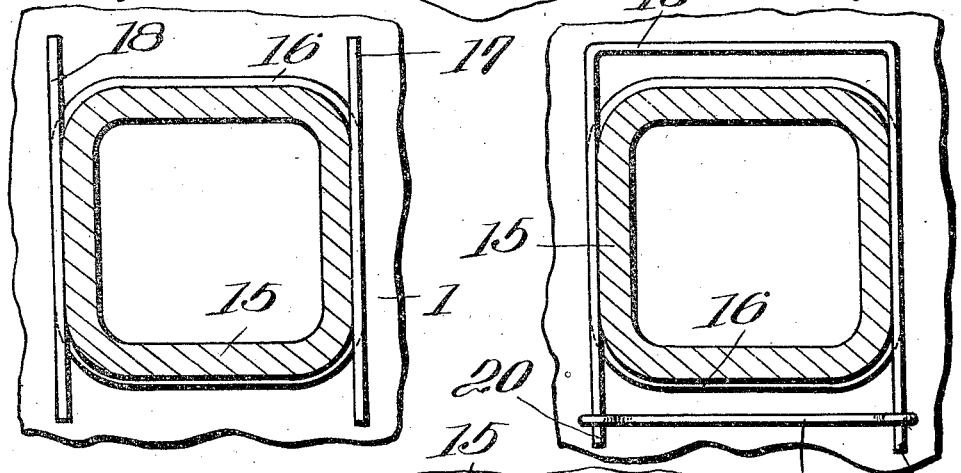
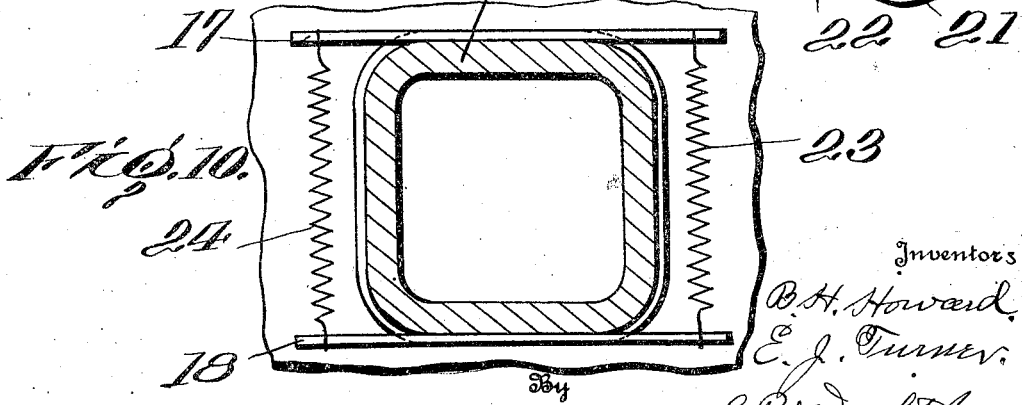

Patented July 8, 1924.

1,500,733

UNITED STATES PATENT OFFICE.

BLOOMFIELD H. HOWARD, OF WASHINGTON, DISTRICT OF COLUMBIA, AND ERNEST J. TURNER, OF PITTSBURGH, PENNSYLVANIA.

FEEDER FOR INGOT MOLDS.

Application filed December 29, 1923. Serial No. 683,498.

*To all whom it may concern:*

Be it known that BLOOMFIELD H. HOWARD and ERNEST J. TURNER, citizens of the United States, residing, respectively, at Washington, District of Columbia, and Pittsburgh, in the county of Allegheny and State of Pennsylvania, have invented certain new and useful Improvements in Feeders for Ingot Molds, of which the following is a specification.

Our invention relates to improvements in feeders for ingot molds used in the manufacture of iron or steel ingots and has for its object the prevention of holes and seams in the upper end of the ingot known as "piping" and at the same time produce a feeder which will reduce "segregation" to a minimum.

Another object of our invention is to provide a feeder which can be extended a greater or less distance into the mold and which will extend a greater or less distance above the upper edge of the mold whereby the feeder can be readily varied to meet the different requirements thereof.

A further object of our invention is to provide a simple, cheap and effective feeder of this character whereby any portion thereof may be broken off at the top or bottom to form a feeder of any desired length.

Referring now to the drawings.

Figure 1 is a perspective view of an ingot mold showing a feeder therein embodying our invention.

Figure 2 is a vertical sectional view of the mold showing the feeder partly in section.

Figure 3 is a vertical sectional view showing the feeder shown in Figure 2 with a portion thereof broken off of the top and the bottom.

Figure 4 is a perspective view of an ingot mold showing a modified form of feeder therein.

Figure 5 is a perspective view of an ingot mold showing a fluted feeder therein.

Figure 6 is a vertical sectional view of an ingot mold showing a modified form of feeder partly in section.

Figure 7 is a side elevation of a modified form of feeder.

Figure 7ª is a perspective view of an ingot mold with a modified form of feeder in position thereon.

Figure 8 is a horizontal sectional view of Figure 7ª.

Figures 9 and 10 are horizontal sectional views showing modified forms of supporting means.

Referring now to the drawings 1 represents the ingot mold and 2 the feeder. The feeder 2 as shown is provided with a series of vertical ribs 3 extending downwardly, the lower ends of which are adapted to rest upon the upper edge of the mold and whereby the feeder is supported in the upper edge of the mold and clearly shown in Figure 2 of the drawings.

The feeder 2 is provided with a series of scores 5 extending in horizontal alinement around the feeder and arranged any desired distance apart. As shown these scores 5 extend through the ribs 3 so as to weaken the same, in order that the feeder can be broken on the line of the scores as will be hereinafter more fully described.

It has been found in the art of casting ingots of different lengths it is necessary to extend the feeder a greater or less distance into the upper end of the mold and also to have the feeder extended a greater or less distance above the upper end of the mold. By this arrangement it will be seen that the scores 5 weaken the feeder at that point, so that the section 6 may be broken off of the lower end of the feeder as clearly shown in Figure 3; the upper end section 7 can also be broken off as shown in Figure 3. In fact the sections 8 and 9 could be broken off and the sections 10 and 11 could be broken off of the upper end and by this construction it will be seen that the distance the feeder extends into the mold or above the mold can be greatly varied. In Figure 6 the scores 12 extend around the feeder, the same as that shown in the other figures but in order to facilitate the breaking of the feeder we have provided vertical scores 13 whereby when it is desired to break a section off of the feeder, it is not necessary to break the whole section at one time but may be broken in portions between the vertical and horizontal scores.

While we have shown and described this specific means of accomplishing the result of our invention it will be understood that we do not desire to limit ourselves to the specific structure shown and described, as the same result could be accomplished in many other ways.

In Figure 7 the scores 14 are vertically arranged and extend from the upper end to the lower end of the feeder and allow the gases to pass out therethrough from the mold.

In Figure 7a the exterior diameter of the feeder 15 throughout is approximately of the same diameter as the inner diameter of the ingot mold 1. The outer periphery of the feeder is provided with a series of scores 16 whereby a portion of the feeder may be broken off. In order to support the feeder in the mold we provide rods 17 and 18 which fit into the scores and having their ends resting upon the top of the mold. These rods can be placed in any of the scores to adjust the feeder in the mold.

In the modification shown in Figure 9 a U-shaped bar 19 replaces the rods 17 and 18. The two ends 20 and 21 of the U-shaped bar 19 are held in position by a bar 22, which locks the U-shaped bars in position.

In Figure 10 the two bars 17 and 18 are held in position by springs 23 and 24.

Having thus fully described our invention what we claim is:—

1. A feeder for ingot molds comprising a body portion constructed so that horizontal sections can be broken off.

2. A feeder for ingot molds comprising a body portion constructed so that horizontal sections can be broken off at its upper or lower ends.

3. A feeder for ingot molds comprising a body portion having horizontal scores extending entirely around the same whereby horizontal sections thereof may be broken off.

4. A feeder for ingot molds comprising a body portion having horizontal scores arranged throughout its length whereby horizontal portions may be broken off from its upper or lower end.

5. A feeder for ingot molds comprising a body portion having outwardly extending supporting ribs adjacent its upper end and horizontal scores extending around the body portion and ribs whereby a horizontal body portion of the feeder can be broken off.

6. A feeder for ingot molds comprising a body portion having ribs extending outwardly therefrom and adjacent the upper end horizontal scores extending around the body portion and through the ribs from the top to the bottom and whereby a horizontal portion of the feeder can be broken off from the top or the bottom of the feeder.

7. A feeder for ingot molds comprising a body portion having a series of horizontal scores extending therearound from the upper to the lower end whereby a horizontal section or sections can be broken off at the upper or lower ends of the feeder.

8. A feeder for ingot molds comprising a body portion having ribs on its outer periphery for supporting the feeder in the mold, horizontal scores extending around the feeder and through the ribs from the upper to its lower end and whereby a horizontal section or sections can be broken off of the upper and lower end of the feeder.

9. A feeder for ingot molds comprising a body portion having horizontal and vertical portions whereby a portion of the feeder can be broken off of the upper or lower ends thereof.

10. A feeder for ingot molds comprising a body portion a series of scores extending therearound, from its upper to its lower end and vertical scores intersecting the horizontal scores whereby a portion of the feeder can be broken off of the upper or lower end.

11. A feeder for ingot molds comprising a body portion having scores to allow a portion of the feeder to be broken off and also to allow the passage of the gases from the mold.

12. A feeder for ingot molds comprising a body portion having scores on its outer periphery and means for supporting the feeder on the mold.

13. A feeder for ingot molds comprising a body portion having scores on its outer periphery, and means functioning with the scores for supporting the feeder on the mold.

14. A feeder for ingot molds comprising a body portion having a series of parallel horizontal scores in its outer periphery and means functioning with the scores for supporting the feeder on the mold.

15. A feeder for ingot molds comprising a body portion having a series of parallel horizontal scores in its outer periphery arranged different distances from ends of the molds and means functioning with the scores for supporting the feeder on the mold.

16. A feeder for ingot molds, comprising a body portion the outer diameter of which is approximately the same as the inner diameter of the ingot mold, and a series of scores, and means functioning with the scores for supporting the feeder on the mold.

In testimony whereof we affix our signatures.

BLOOMFIELD H. HOWARD.
ERNEST J. TURNER.